Figure 1:
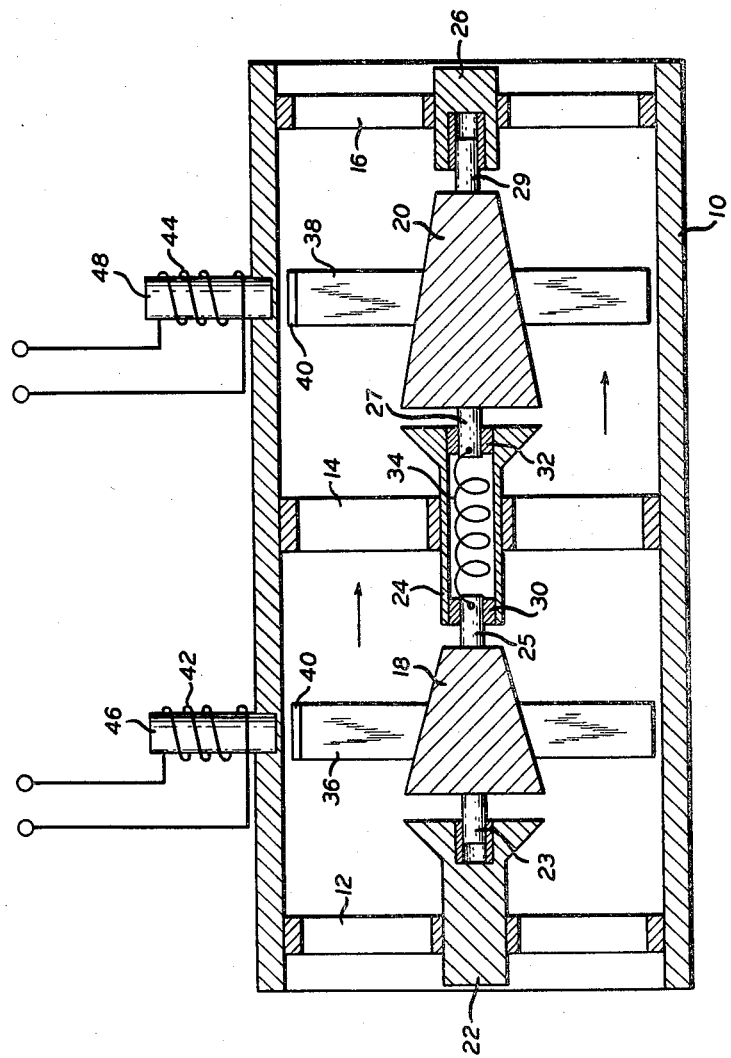

July 5, 1960 D. M. POTTER 2,943,487
MASS FLOW METER USING TANDEM ROTORS
Filed Nov. 1, 1957 2 Sheets-Sheet 1

FIG. I.

INVENTOR
DAVID M. POTTER
BY
*Berry & Crews*
ATTORNEYS.

INVENTOR
DAVID M. POTTER
BY
ATTORNEYS.

United States Patent Office 2,943,487
Patented July 5, 1960

2,943,487

MASS FLOW METER USING TANDEM ROTORS

David M. Potter, Town of Far Hills,
Warren Township, N.J.

Filed Nov. 1, 1957, Ser. No. 693,988

6 Claims. (Cl. 73—231)

This invention relates to fluid flow meters (liquid or gas), and is particularly concerned with a novel sensing device capable of deriving from the flowing fluid control impulses which are a joint function of the velocity and density of the fluid and which may be utilized for producing an indication of the mas rate of flow of the fluid, and of the total mass of fluid delivered during an operating period.

Although the invention is not confined to flow meters of the Potter type, it has been worked out in connection with the Potter flow meter as disclosed in United States Patent #2,709,366, and is illustratively shown and described herein in connection with that type of instrument.

Briefly, the invention, in its most advantageous form, comprises two vaned rotors, preferably of the Potter type, disposed one behind the other in a stream whose mass flow is to be measured and indicated, the rotors being connected end to end through a torsion spring. The rotors have their vanes set at different average angles so that the rotors are geared differently to the fluid stream, causing one rotor to lead the other and to drag the other around with it. Through the spring, the rotors are yieldingly compelled to turn in unison, but under uniform flow conditions the rotors are maintained uniformly out of phase by an amount which is a function both of the density of the flowing fluid and of the square of the velocity of the flowing fluid. The angular displacement between the two rotors can be shown to be proportional to the momentum of the fluid.

Each rotor may be designed to produce one or more electrical impulses per revolution, and these impulses after amplification and differentiation or wave shaping are used through an electronic trigger, desirably of the Schmitt type, to control an electronic gate, the impulse from the leading rotor serving to open the gate and the impulse from the trailing rotor serving to close the gate. While the gate is open pulses from a constant frequency timing oscillator are caused to pass through the gate, thence, through a calibration network which applies a proper calibration constant (converting the constant frequency pulses per cycle i.e., per gate opening, to mass units per second) and into a digital, rate indicating, display counter. This counter displays the count until the next pulse from the leading rotor resets the counter to zero and starts a fresh counting cycle.

To obtain an indication of total mass transferred through the conduit, the signal pulses representing mass flow are fed also through an inhibited electronic gate. This gate is operated in the same manner as the first, being opened by an impulse from the leading rotor and closed by an impulse from the trailing rotor. There is this difference, however, that the second gate can only be opened periodically, say once in each second. After being closed by an impulse from the trailing rotor, the gate cannot be reopened by an impulse from the leading rotor until it has been reset by an impulse from a timing oscillator to precondition it for such reopening. When the gate has been reset, the next impulse from the leading rotor starts a count of pulses transmitted through the gate by a totalizing digital counter which accumulates the successive counts effected once each second, indicating the accumulated total until the counter is manually reset to zero.

If an analogue output (D.C. proportional to mass flow rate and hence to the number of oscillator impulses which pass the gate in a single cycle) is required, a simple capacitative network converter, similar to that embodied in Potter flow meter model 3C as set forth in a pamphlet entitled "Operating Instructions for the Potter Electronic Frequency Converter—model 3C-(N)," published by the Potter Aeronautical Company of Union, New Jersey, may be utilized in place of the digital calibration circuit and display counter.

Other objects and advantages will hereinafter appear.

In the drawing forming part of this specification

Figure 2:
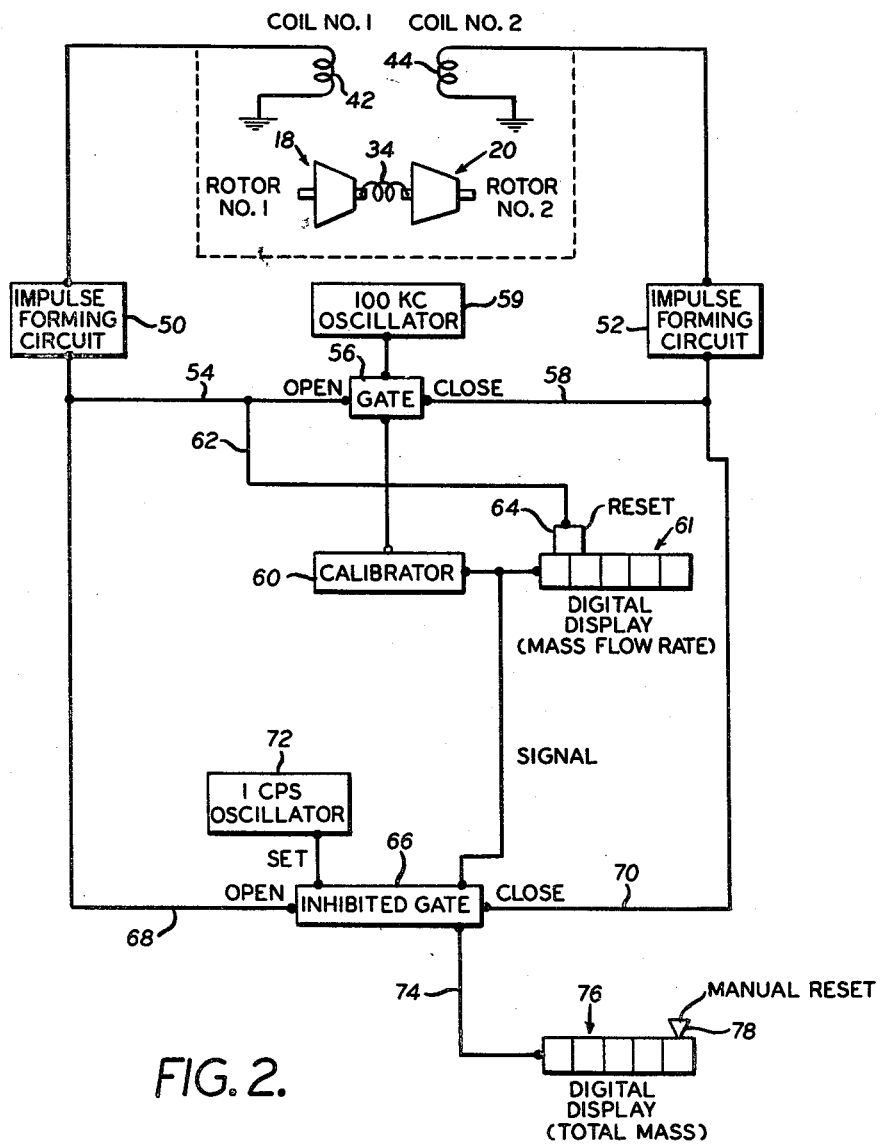

Fig. 1 is a view in longitudinal section through a conduit segment, showing an illustrative composite rotary sensor of a practical and advantageous form, and associated signal generating means; and Fig. 2 is a diagrammatic showing of one form of indicator means and circuitry through which the impulses devised from the sensor are given sensible meaning.

In Figure 1 disclosure is made of a conduit segment 10 in which three bearing spiders 12, 14 and 16 are provided for carrying vaned rotors 18 and 20 in coaxial relation to the conduit segment 10 and to one another. The spider 12 supports a stationary bearing and shielding member 22 in which a forward journal portion 23 of the rotor 18 is rotatably and slidably mounted. A similar, but hollow stationary bearing and shielding member 24 is carried by the spider 14, and has a rear journal portion 25 of the rotor 18 rotatably and slidably mounted in it. The member 24 also has a forward journal portion 27 of the rotor 20 rotatably and slidably mounted in it. A stationary bearing member 26, carried by the spider 16, has the rear journal portion 29 of the rotor 20 rotatably mounted in it. The members 22 and 24 include conical shielding portions which cooperate with conical body portions of the rotors 18 and 20 to relieve the rotors of end thrust in accordance with the familiar principle of the Potter flow meter.

As has been mentioned, the combined bearing and shielding member 24 is hollow, although it is substantially closed at its ends by bearing collars 30 and 32, which closely surround the associated journal portions of the rotor. A suitable torsion member such as coil spring 34, located within the member 24, is connected at its opposite ends to the journal 25 of the rotor 18 and to the journal 27 of the rotor 20. The rotors 18 and 20 are provided, respectively, with vanes or blades 36 and 38 which are disposed at fixed inclinations to cause each rotor to tend to turn at a predetermined rotary speed for any given rate of fluid flow. The blades 36 and 38 are of different average pitch, so that for a given rate of fluid flow they tend to turn at different rates. Whichever rotor has its blades disposed at the greater average angle to the conduit axis will tend to turn faster. The rotors are compelled by the spring 34 to turn in unison at a rate which is a compromise between the natural or uninhibited rates of the two rotors, but out of phase with one another by an amount which is a function of the momentum of the flowing fluid. That is to say, the out of phase condition increases with increase of the fluid velocity and with increase of the fluid density.

Before proceeding further with the description it is desirable to analyse more precisely the factors which bear upon the angular displacement of the rotors relative to one another under uniform flow conditions. The torque applied to the spring 34 will be equal to the difference of driving torques applied to the rotors. The torque T, tending to advance the leading rotor relative to the trailing rotor, will be $$T=CRDV^2 (\tan A_1 - \tan A_2) \qquad (1)$$

where R is the average effective radius of the rotor blades of each rotor, D is the density (mass per unit volume) of the fluid, V is the velocity of the fluid, $A_1$ is the average blade angle of the leading rotor, $A_2$ is the average blade angle of the trailing rotor, and C is a constant. Substituting constant K for $CR$ ($\tan A_1 - \tan A_2$) we have $$T = KDV^2 \qquad (2)$$

The angular displacement X of the spring can be written $$X = \frac{T}{k} = \frac{KDV^2}{k} = K_1 DV^2$$

where small $k$ is the spring constant in torsion and $K_1$ is equal to $K/k$. Equation 3 confirms the statement previously made, that the angular displacement, or out of phase condition of the rotors, is proportional to the fluid momentum. It should be particularly noted, however, that the phase displacement is proportional to the square of the velocity—not merely to the first power. In order to obtain the mass flow rate, DV per unit area, one power of the velocity must be extracted. Since the velocity of the fluid, as in the standard Potter flowmeter, is proportional to the speed of rotation of the rotor assembly, the novel sensor itself provides this facility for automatic extraction of the velocity. This is illustrated as follows, where the time between impulses from the two rotors is given by $$\text{Time between impulses} = \frac{\text{angular distance}}{\text{angular velocity}} = \frac{X}{S}$$

The angular velocity S of the turbine flowmeter is $$S = \frac{V \tan A}{2 \pi R}$$

where A is the average blade angle of the rotor. Therefore time between impulses $$= \frac{X}{S} = \frac{2\pi R K_1}{\tan A} \frac{DV^2}{V} = K_2 DV$$

where $K_2$=constant.

Thus the time between impulses from the two rotors is a direct measure of the mass flow rate.

The required signals are obtained from the sensing element as follows:

One blade of each rotor is provided with a tip 40 of magnetic material (430 stainless steel for example) and coils of wire 42 and 44 having permanent magnetic cores 46 and 48, are associated with the respective rotors 18 and 20, being desirably fixed in corresponding angular positions relative to the conduit axis. As each tipped blade passes the associated coil, the decrease in magnetic reluctance causes a current to be induced in the coil. The fluid velocity may thus be obtained by counting the number of impulses per unit of time from one rotor, exactly as is done in the Standard Potter flow meter, and the time between impulses from the two rotors provides the mass flow rate as described above.

One direct and advantageous form of mechanism for reducing the time between impulses of the two rotors to mass flow rate and total mass transfer, is diagrammatically shown in Fig. 2.

The impulses from coils 42 and 44 are first amplified and differentiated or shaped in networks designated 50 and 52, electronic trigger circuits of the Schmitt type being used for accurate time scale resolution. The Schmitt trigger circuits are of the type manufactured commercially by the Potter Aeronautical Corporation of Union, N.J., and are identified as model No. SA-1. The leading impulse, which may be assumed to be the impulse from coil 42, is then transmitted through a conductor 54 to open an electronic gate 56, and the corresponding trailing impulse from coil 44, when generated, is transmitted through a conductor 58 to close the gate 56. While the gate is open, an A.C. signal from a constant frequency timing oscillator 59, say of a frequency of 100,000 cycles per second, is caused to pass through the gate, then through a digital calibration network 60 which applies the proper conversion factor from pulses per gate opening to mass units per second, and thence into an electronic digital display counter 61. The counter is caused to display the reading from the closing of the gate 56 to the next opening of the gate, but upon the next opening of the gate a part of the amplified impulse from the coil 42 is transmitted through a conductor 62 to a device 64 for resetting the counter to zero. With the arrangement described, the counter retains its maximum reading throughout the major portion of each cycle.

The commercially available Berkeley Electronic Counter (Model 7260, manufactured by the Berkeley Division of Beckman Instrument Corp. of 2200 Wright Ave., Richmond, Calif., or the equivalent) can be utilized as the mass flow rate indicating system 50—64 of Figure 2 and will provide a digital reading directly proportional to the mass flow rate.

In order to obtain a showing of the total mass transferred over an operating period, the gated and calibrated signals from the oscillator 59, representing mass flow rate, are fed through an inhibited electronic gate 66. The gate 66 is like the gate 56. It is opened by the amplified signal from coil 42, transmitted through a conductor 68, and is closed by the amplified signal from coil 44, transmitted through a conductor 70. The gate 66 will not open in response to an impulse from the coil 42 until it has been preconditioned for such an opening by an impulse from a periodic, say one cycle per second, oscillator 72. After such preconditioning, the first impulse from the coil 42 reopens the gate and starts a count. A suitable component for use as the inhibited gate 66 is Wallkirt model M 2003 as made by the Wallkirt Co. of 145 West Hazel St., Inglewood, Calif. The oscillator 72 is desirably Hewlett Packard model HP-202C as made by Hewlett Packard Corporation of 275 Page Mill Road, Palo Alto, Calif.

It will be evident that the count secured during one lag period is run into the counter in each second and hence that once each second a count corresponding to the mass units per second will be transmitted over a conductor 74 to an electronic digital display counter 76. The counter 76 is not automatically returned to zero but accumulates the counts from beginning to end of any desired operating period. The counter 76, therefore, exhibits the total mass transferred. The counter may be reset to zero by a manual resetting device 78 whenever desired. The counter 76 and the resetting device 78 may be Hewlett Packard model HP-521A as made by the Hewlett Packard Corporation of Palo Alto, Calif.

While a certain preferred embodiment of the invention has been illustrated and described in detail, it is to be understood that changes may be made therein and the invention embodied in other structures. It is not, therefore, the intention to limit the patent to the specific construction illustrated, but to cover the invention broadly in whatever form its principles may be utilized.

I claim:

1. A fluid flow sensing device comprising, in combination, a conduit segment for conducting a confined stream of fluid, a pair of fluid actuated rotors mounted coaxially in said conduit one behind the other, and having a substantially predetermined or in phase relationship with one another at a minimum flow of the stream, one of said rotors being differently geared to the fluid stream from the other, so that one rotor tends to turn faster than the other, torsion spring means connecting the rotors to one another and yieldingly compelling them to turn substantially in unison subject to a phase difference whose magnitude is a function of the momentum of the flowing fluid, and means causing said out of phase rotors to generate signal impulses each at uniform, predetermined equal angular intervals such that the phase difference between the signal impulses from the two rotors corresponds to the fluid-flow-caused phase displacement of the rotors and the period between impulses from the two rotors corresponds to the mass rate of flow of the fluid stream, whereby a measure of the out of phase period of the rotors may be secured and made available for indicating the rate of mass flow.

2. A fluid flow sensing device comprising, in combination, a conduit segment for conducting a confined stream of fluid, a pair of fluid actuated vaned rotors mounted coaxially in said conduit one behind the other, and having a substantially predetermined or in phase relationship with one another at a minimum flow of the stream, one of said rotors being of different pitch from the other, so that one rotor tends to turn faster than the other in response to fluid flow, torsion spring means connecting the rotors end to end and compelling them to turn substantially in unison but subject to a phase difference whose magnitude is a function of the momentum of the flowing fluid, and means causing said out of phase rotors to generate signal impulses each at uniform, predetermined equal angular intervals such that the phase difference between the signal impulses from the two rotors corresponds to the fluid-flow-caused phase displacement of the rotors and the period between impulses from the two rotors corresponds to the mass rate of flow of the fluid stream, whereby a measure of the out of phase period of the rotors may be secured and made available for indicating the rate of mass flow.

3. A fluid flow sensing device comprising, in combination, a conduit segment for conducting a confined stream of fluid, a pair of fluid actuated, vaned rotors mounted coaxially in said conduit one behind the other, and having a substantially predetermined or in phase relationship with one another at a minimum flow of the stream, combined bearing and deflecting shield members at the upstream sides of the rotors and a bearing at the downstream side of the second rotor, the combined bearing and deflecting shield member at the upstream side of the second rotor serving also as a downstream bearing for the first rotor and being of hollow construction, one of said rotors being of different pitch from the other, so that one rotor tends to turn faster than the other, torsion spring means lodged within the hollow combined bearing and deflecting shield member at the upstream side of the second rotor and connecting the rotors yieldingly to one another for compelling them to turn substantially in unison but subject to a phase difference whose magnitude is a function of the momentum of the flowing fluid, and means causing said out of phase rotors to generate signal impulses each at uniform, predetermined equal angular intervals such that the phase difference between the signal impulses from the two rotors corresponds to the fluid-flow-caused phase displacement of the rotors and the period between impulses from the two rotors corresponds to the mass rate of flow of the fluid stream, whereby a measure of the out of phase period of the rotors may be secured and made available for indicating the rate of mass flow.

4. A mass flow meter comprising, in combination, a conduit segment for conducting a confined stream of fluid, a pair of fluid actuated vaned rotors mounted coaxially in said conduit one behind the other, torsion spring means connecting the rotors end to end and yieldingly compelling them to turn substantially in unison subject to a phase difference whose magnitude is a function of the momentum of the flowing fluid, said rotors having a substantially predetermined or in phase angular relationship with one another at a minimum flow of the stream, one of said rotors being of different pitch from the other, so that one rotor tends to turn faster than, and to lead, the other, in response to fluid flow, means causing said out of phase rotors to generate control impulses each at uniform, predetermined equal angular intervals such that the phase difference between the signal impulses from the two rotors corresponds to the fluid-flow-caused phase displacement of the rotors and the period between impulses from the two rotors corresponds to the mass rate of flow of the fluid stream, whereby a measure of the out of phase period of the rotors may be secured and made available for indicating the rate of mass flow, and electrical circuit means associated with said control impulse generating means comprising an electronic gate connected to be opened in response to each impulse from the leading rotor and closed in response to each impulse from the trailing rotor, an oscillator connected to deliver impulses of predetermined frequency through the gate so long as the gate is open, so that the number of pulses so delivered in a single open period is a measure of the out of phase period of the rotors and of the mass flow rate of the fluid, and means utilizing the impulses delivered through the gate to provide a sensible indication of the mass flow rate of the fluid.

5. A mass flow meter comprising, in combination, a conduit segment for conducting a confined stream of fluid, a pair of fluid actuated vaned rotors mounted coaxially in said conduit one behind the other, torsion spring means connecting the rotors end to end and yieldingly compelling them to turn substantially in unison subject to a phase difference whose magnitude is a function of the momentum of the flowing fluid, said rotors having a substantially predetermined or in phase angular relationship with one another at a minimum flow of the stream, one of said rotors being of different pitch from the other, so that one rotor tends to turn faster than, and to lead, the other in response to fluid flow, means causing said out of phase rotors to generate control impulses each at uniform, predetermined equal angular intervals such that the phase difference between the signal impulses from the two rotors corresponds to the fluid-flow-caused phase displacement of the rotors and the period between impulses from the two rotors corresponds to the mass rate of flow of the fluid stream, whereby a measure of the out of phase period of the rotors may be secured and made available for indicating the rate of mass flow, and electrical circuit means associated with said control impulse generating means comprising an electronic gate connected to be opened in response to each impulse from the leading rotor and closed in response to each impulse from the trailing rotor, an oscillator connected to deliver pulses of predetermined frequency through the gate so long as the gate is open, so that the number of pulses so delivered in a single open period is a function of the out of phase period of the rotors and a measure of the mass flow rate of the fluid, a calibrator for correlating the number of passed pulses per gate opening to the number of mass units per unit of time, and an electronic counter responsive to the calibrated signal to count and display the number of mass units per unit of time corresponding to the duration of each gate opening.

6. A mass flow meter comprising, in combination, a conduit segment for conducting a confined stream of fluid, a pair of fluid actuated vaned rotors mounted coaxially in said conduit one behind the other, torsion spring means connecting the rotors end to end and yieldingly compelling them to turn substantially in unison subject to a phase difference whose magnitude is a function of the momentum of the flowing fluid, said rotors having a substantially predetermined or in phase angular relationship with one another at a minimum flow of the stream, one of said rotors being of different pitch from the other, so that one rotor tends to turn faster than, and to lead, the other in response to fluid flow, means causing said out of phase rotors to generate control impulses each at uniform, predetermined equal angular intervals such that the phase difference between the signal impulses from the two rotors corresponds to the fluid-flow-caused phase displacement of the rotors and the period between impulses from the two rotors corresponds to the mass rate of flow of the fluid stream, whereby a measure of the out of phase period of the rotors may be secured and made available for indicating the rate of mass flow, and electrical circuit means associated with said control impulse generating means comprising an electronic gate connected to be opened in response to each impulse from the leading rotor and closed in response to each impulse from the trailing rotor, an oscillator connected to deliver pulses of predetermined frequency through the gate so long as the gate is open, so that the number of pulses so delivered in a single open period is a measure of the mass flow rate of the fluid, means utilizing the pulses delivered through the gate to provide a sensible indication of mass flow of the fluid, a second gate also connected to be opened in response to impulses from the leading rotor and closed in response to impulses from the trailing rotor and arranged to pass pulses from the signal pulse oscillator, inhibiting means associated with the second gate comprising a low frequency oscillator and means requiring the second gate to be subjected to an impulse from said oscillator as a precondition to the opening of the gate, so that only the number of signal impulses which pass the gate in a single open-gate period can be passed for each unit of time determined by the low frequency oscillator, and means utilizing the pulses delivered through the second gate to effect a sensible cumulative indication of the total number of mass units of fluid delivered.

References Cited in the file of this patent
UNITED STATES PATENTS

| | | |
|---|---|---|
| 2,534,712 | Gray | Dec. 19, 1950 |
| 2,602,330 | Kollsman | July 8, 1952 |
| 2,683,224 | Cole | July 6, 1954 |
| 2,714,310 | Jennings | Aug. 2, 1955 |
| 2,800,022 | Granberg | July 23, 1957 |
| 2,832,218 | White | Apr. 29, 1958 |
| 2,857,761 | Bodge | Oct. 28, 1958 |
| 2,877,649 | Powers | Mar. 17, 1959 |

FOREIGN PATENTS

| | | |
|---|---|---|
| 740,037 | Great Britain | Nov. 5, 1955 |
| 744,852 | Great Britain | Feb. 15, 1956 |